United States Patent [19]
Kainz et al.

[11] Patent Number: 4,757,180
[45] Date of Patent: Jul. 12, 1988

[54] TRANSPORT DEVICE FOR A WELDING WIRE, PARTICULARLY FOR ROBOTS

[75] Inventors: Franz Kainz, Augsburg; Karel Mazac, Friedberg; Helmut Obermeier, Königsbrunn; Peter Rippl, Augsburg; Josef Stadler, Friedberg/Wulfertshausen; Ernst Zimmer, Friedberg, all of Fed. Rep. of Germany

[73] Assignee: Kuka Schweibanlagen + Roboter GmbH, Fed. Rep. of Germany

[21] Appl. No.: 936,469

[22] Filed: Nov. 25, 1986

[30] Foreign Application Priority Data

Nov. 29, 1985 [DE] Fed. Rep. of Germany ....... 3542314

[51] Int. Cl.⁴ .............................................. B23K 9/12
[52] U.S. Cl. ................................. 219/137.2; 219/136; 219/137.71; 901/42
[58] Field of Search .................. 219/136, 137.2, 137.7, 219/137.71; 901/42

[56] References Cited

U.S. PATENT DOCUMENTS

| | | | |
|---|---|---|---|
| 3,293,477 | 12/1966 | Lobosco | 219/137.7 |
| 3,344,305 | 9/1967 | Ogden et al. | 219/137.7 |
| 3,693,858 | 9/1972 | Araya et al. | 219/137.7 |
| 3,898,419 | 8/1975 | Smith | 219/137.7 |
| 3,924,094 | 12/1975 | Hansen et al. | 219/137.71 |
| 4,205,771 | 6/1980 | Samokovliski et al. | 219/137.7 |
| 4,539,465 | 9/1985 | Bosna | 219/137.7 |

*Primary Examiner*—Clifford C. Shaw
*Attorney, Agent, or Firm*—McGlew and Tuttle

[57] ABSTRACT

The invention relates to a transport device for welding wire feed for welding equipment, in particular arc shield-gas welding tools on manipulators. The welding wire is transported from a magazine or reel with the aid of two separate drives. The main drive determines the feed and it is mounted near the application welding die, while the auxiliary is arranged spaced therebehind. The motor of the main drive is controlled to a constant speed corresponding to the selected feed, while the auxiliary drive acts on the welding wire with slip. The motor of the auxiliary drive is also controlled to a constant speed, the speed adjustment of the drives being, however, control-technologically connected for maintenance of a certain difference of the transport speeds.

8 Claims, 3 Drawing Sheets

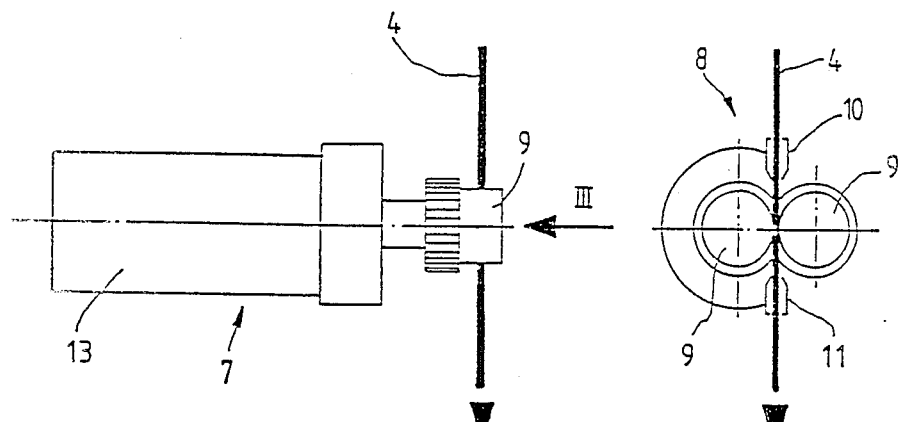
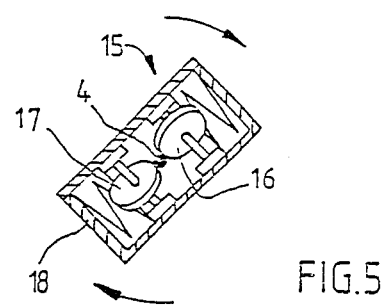
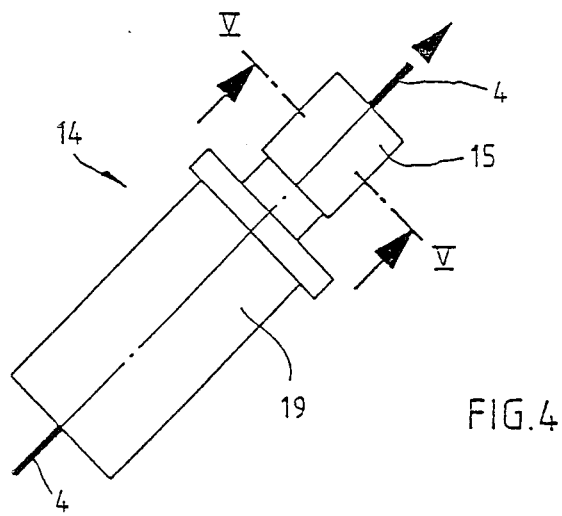

TRANSPORT DEVICE FOR A WELDING WIRE, PARTICULARLY FOR ROBOTS

FIELD AND BACKGROUND OF THE INVENTION

The invention relates in general to welding and in particular to a new and useful transport device for welding wire feed at welding equipment, in particular arc shield-gas welding tools disposed as manipulators.

Welding equipment, in particular automatic welding machines or welding robots, have a disadvantage that, despite the diverse movements of the welding tool, the wire must be supplied to and emerge from the welding die or tip always at the same speed and with the same force. This is true in particular for arc shield-gas welding equipment. The welding die moves over a relatively long guide distance. In track welding, the welding die must often follow complicated paths in space, the welding wire guide being moved along. These changes of direction of the wire guide complicate the wire transport and lead to vibrations in the wire feed system even if the die moves fast. Due to these factors, the wire feed is no longer constant, and hence the welding quality suffers.

It is known for hand-held torches to use two mutually independent drives for the transport of the welding wire. The rear drive, arranged near the wire roll, then constitutes the main drive, which essentially determines the wire feed. The front drive is located near the welding die and, being a small size auxiliary drive, is integrated in the torch handle. Thereby mainly welding wires of soft materials susceptible to buckling are conveyed. It has been found in the practice that the known transport device cannot meet the requirements for constant welding wire supply. Besides, high motor loads result, which shorten the life of this device.

SUMMARY OF THE INVENTION

The present invention provides a device with which a welding wire feed constant as to speed and force can be ensured even for a prolonged time.

With the transport device according to the invention, the welding wire can be supplied as required. Also in seam tracking systems the highest possible process stability is established. Besides, the entire feed system is optimized for a long operating time (as a rule 100%).

The main drive, which in the last analysis determines the force and speed of the welding wire feed, is, according to the invention, arranged near the welding die. The actual distance from the welding die depends on what possible obstacles may still affect the welding wire in the conduction between the main drive and the welding die and varies in this respect with the given machine conditions. For the use of welding robots it is advisable to arrange the main drive at the last moving limb of the robot hand.

The magazine for the welding wire, usually a roll, is advantageously arranged at the welding equipment or it is separated therefrom. Depending on the length of the transport path from the magazine to the welding equipment, one or more auxiliary drives are employed of the drive motors, at least that of the main drive is controlled to constant speed. The motors of the auxiliary drives may be set, independently thereof to a certain desired speed, or they may be speed-controlled also.

In both cases it is essential that each auxiliary drive operates with slip. Depending on the design of the drives, this slip may be adjustable. The slip of each individual auxiliary drive ensures that the force with which the welding wire is supplied to the main drive from behind never exceeds a preselected maximum vlaue. This would be the case for instance when in certain movement positions of the welding die the friction resistances in the wire track become minimal.

On the other hand, with the rising of friction forces due to stronger curvature of the wire conduction or the like, the auxiliary drives provide that these force fluctuations are equalized and do not influence the main drive. For this purpose, it is advisable to adjust the slip limit to a force which is at least equal to or greater than the maximum friction forces or similar resistances to be expected, counteracting the wire transport. In this manner it is assured that the welding wire is always present at the main drive with approximately equally great and equally directed force and that the feed forces do not change over from pulling, pushing or vice versa.

If the main and auxiliary drives are speed-controlled, a control-technological coupling of the drive motors is advisable. This coupling inspires that, if the feed velocity of the main drive changes, the auxiliary drives are readjusted and vice versa. Thus, a constant ratio of the feed velocity of the drive is preserved for all operating conditions.

With respect to the speed control of the drive motors there are several possibilities. In cases where the resistance forces in the wire conduction between auxiliary drives and main drive do not fluctuate too much, it may suffice to set all drives to the same feed speed. In other cases, especially when using the transport device in connection with welding robots which execute very rapid and continuously changing movements, adjustment to different feed speeds is advisable. In the embodiment examples shown, the auxiliary drives are preferably set to push mode with higher feed speed than the main drive. Alternatively, the auxiliary drives may be made to run in pull mode at a lower speed than the main drive. For use on welding robots it has proved desirable to choose the feed speed of the auxiliary drives about 10 to 40% higher than that of the main drive.

The transport device may be equipped in the sense of the main claim with different drive systems for the main drive and auxiliary drives. The use of the swirl head for the individual auxiliary drive has the advantage, besides the simple formation and easy adjustability of the slip, that the welding wire is straightened (oriented) during passage through the auxiliary drive and impurities on its circumference are removed. It is thus possible without any further precautions to process welding wires also of lower quality. The swirl head brings with it also vibration effects in the wire conduction which have a favorable effect on uniform wire feed and moreover facilitate the threading of a new welding wire.

For the main drive it is advisable, for reasons of space and weight, to use a two-roller wire drive, where preferably both rollers are driven. Alternatively, one roller only may be driven.

To obtain as rapid and stiff as possible an adjustment to constant speed, it is desirable to use tacho-controlled dc motors with external excitation. Alternatively, any other drive motors, for example disc wheels, may be used or another type of speed regulation may be provided.

The transport device according to the invention can be used in connection with a great variety of welding equipment, e.g. also hand-held welding machines. But they are suitable in particular for use on automatic welders, welding robots, etc Especially in connection with welding robots, the invention permits external storing of the welding wire and a multiple supply of the welding robots. The welding wire is then supplied to the individual welding robots from a central station over a relatively long path with several auxiliary drives. The advantage of this is also that the welding wire may be wound on rolls in lengths of any quantity. Until now the wire reserve was limited by the maximum roll weight that the robot could carry. With the invention, furthermore, the tooling times are shortened.

Accordingly, it is an object of the invention to provide a transport device for a welding wire feed, particlarly for robots which comprises an applicator or a die for applying the welding wire at a location to be welded, and a feeding device for feeding the welding wire from a wire supply such as a spool or reel to an applicator or die which includes at least one main drive enaged with the wire adjacent the applicator and having a drive motor which is controlled so as to run at a substantially constant speed and at least one additional auxiliary drive having a slip drive connection to the welding wire, engage the wire at its location before the main drive.

A further object of the invention is to provide a transport device particularly for welding wire which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is an enlarged elevational view of the main drive of the transport device of FIG. 1;

FIG. 3 is an end elevational view of the main drive in arrow direction III of FIG. 2;

FIG. 4 is an enlarged elevational view of the auxiliary drive of FIG. 1;

FIG. 5 is a section through the auxiliary drive of FIG. 4 taken along the sectional line V—V of FIG. 4.

DESCRIPTION OF THE PREFERRED EMBODIMENTS

Figure 1:
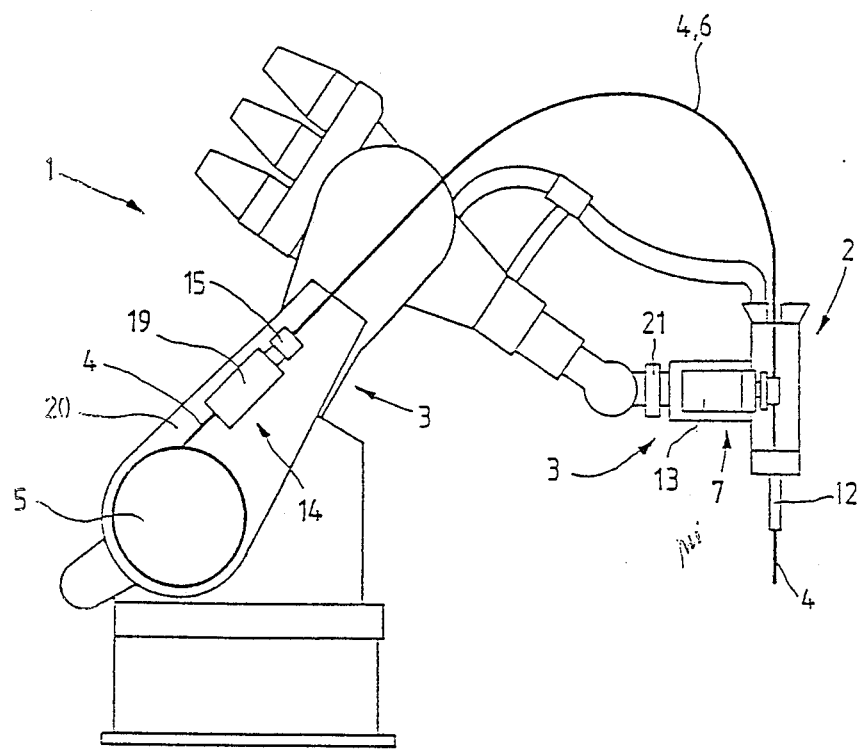
FIG. 1 is a side elevational view of a transport device for a welding equipment at an industrial robot constructed in accordance with the invention.

Referring to the drawings in particular, the invention embodied therein in FIG. 1 comprises a transport device for a welding wire feed particularly for a robot such as a robot 1, which has an applicator or welding die 12 carried at its outermost link or hand 21. The welding wire 4 is fed from a reel supply 5 by means for feeding the welding wire which includes a main drive 7 and at least one auxiliary drive 14. In accordance with the invention the main drive 7 is advantageously operated so that its drive runs at a substantially constant speed and at least one additional drive includes one or more drive units 14 having a slip drive connection to the welding wire and located at a location spaced before the main drive 7.

FIG. 1 shows a six axis industrial robot 1 which guides at its hand 21 a welding device or welding equipment 2 in the form of an arc shield-gas welding tool. The welding wire 4, which is supplied via a transport device 3 from a wire roll 5 at the rocker arm 20, emerges at the welding die 12.

The transport device 3 includes an auxiliary drive 14 and a main drive 7. The auxiliary drive 14 is mounted near the wire roll 5 on the rocker arm 20 of the robot 1 and pushes the welding wire 4 through a wire conduction 6 freely installed in space in the form of a flexible tube, to the main drive 7 which is arranged at the hand 21 of the robot 1.

The robot 1 is able to make track welds with the welding die 12 and to this end moves the welding die 12 on sometimes complicated paths through space, whereby also the transport speed may vary. The wire conduction 6 must follow these path movements, so that it continuously changes its curvature and also is subjected to torsional loads. These changes of form lead to continuously changing friction resistances and to vibrations which affect the constant wire feed. The wire 4 should, however, be supplied to the main drive 7, which determines the speed of the wire feed, independently of these force fluctuations always with as constant as possible a force and speed. In fact, as soon as these forces fluctuate, the main drive 7 changes motor speed and hence to a change in feed speed of the welding wire 4.

The transport device 3 compensates these force fluctuations.

The main drive 7 and auxiliary drive 14 have externally excited dc motors 13.19, which are speed controlled via an ac tachogenerator. The set values of the speeds are adjusted so that the transport velocity of the auxiliary drive 14 is higher by 10 to 40% than the wire feed velocity of the main drive 7. The drive motor 13 and 19 of the two drives 7 and 14 are coupled through the control in such a way that a change of speed of the main drive 7 brings about an analogous change of the speed of the auxiliary drive 14. Thus the set difference in feed velocities is maintained in all operational states.

The auxiliary drive 14 acts on the welding wire 4 via a swirl head 15 (cf. FIGS. 4 and 5). The welding wire 4 is supplied through the hollow shaft of the motor 19. The swirl head 15 includes two rollers 16 and 17 which hold the welding wire 4 clamped between them. The rollers 16,17 are set obliquely to the welding wire 4, with their axes crossing. The axles of the rollers 16 and 17 are guided in the roller holder 18 of the swirl head 15 adjustable relative to the welding wire 4 and spring loaded. Thereby the rollers 16 and 17 can be adjusted radially to the welding wire 4 and be pressed on. The roller holder 18 of the swirl head 15 is set in rotation by the motor 19, whereby the freely rotating rollers 16 and 17 are moved around the welding wire 4 and are thus set in rotation thmselves. Due to this rotation and roll-off movement of the obliquely set rollers 16 and 17 the welding wire 4 is transported in the direction of the arrow (cf FIG. 4).

By its rollers 16 and 17 the swirl head 15 transports the welding wire 4 with slip. The maximally transmissible friction force, i.e. the slip limit, is adjustable through the spring loading of the rollers 16,17. The slip limit is adjusted so that the supplied friction force is at least equal to, but preferably much greater than the maximum friction resistance acting on the wire feed in the wire conduction 6. As a result, the auxiliary drive 14 supplies the welding wire 4 to the main drive 7 at very largely constant force and speed, overcoming the fluctuating friction resistances in the wire conduction 6. As soon as the resistances become minimal, for example in stretched position of the wire conduction 6, the slip of the auxiliary drive 14 brings it about that the force with which the welding wire 4 is supplied to the main drive 7 does not exceed a predetermined maximum, thereby pushing the main drive 7 over or flexing and folding the welding wire 4 guided in the wire conduction 6 with play. The slip of the auxiliary drive 14 is for this purpose adapted to the transport conditions of the main drive 7.

The main drive 7 has a two roller wire drive 8 (cf. FIG. 2 3), in which both rollers 9 are driven. The welding wire 4 is introduced via an inlet 10 between two mutually opposite rollers 9 which clamp it between them and convey it through the outlet 11. When usng the shown two-roller wire drive 8, the transport speed difference between auxiliary drive 14 and main drive 7 is adjusted preferably to about 20%.

Instead of the above described push mode through the faster running auxiliary drive 14, the friction force fluctuations may be compensated through a pull mode. The auxiliary drive 14 then runs at a transport speed lower by about 10-40% than the main drive 7, decelerating the wire feed at the main drive 7 while compensating the force fluctuations in the wire conduction 6.

Figure 6:
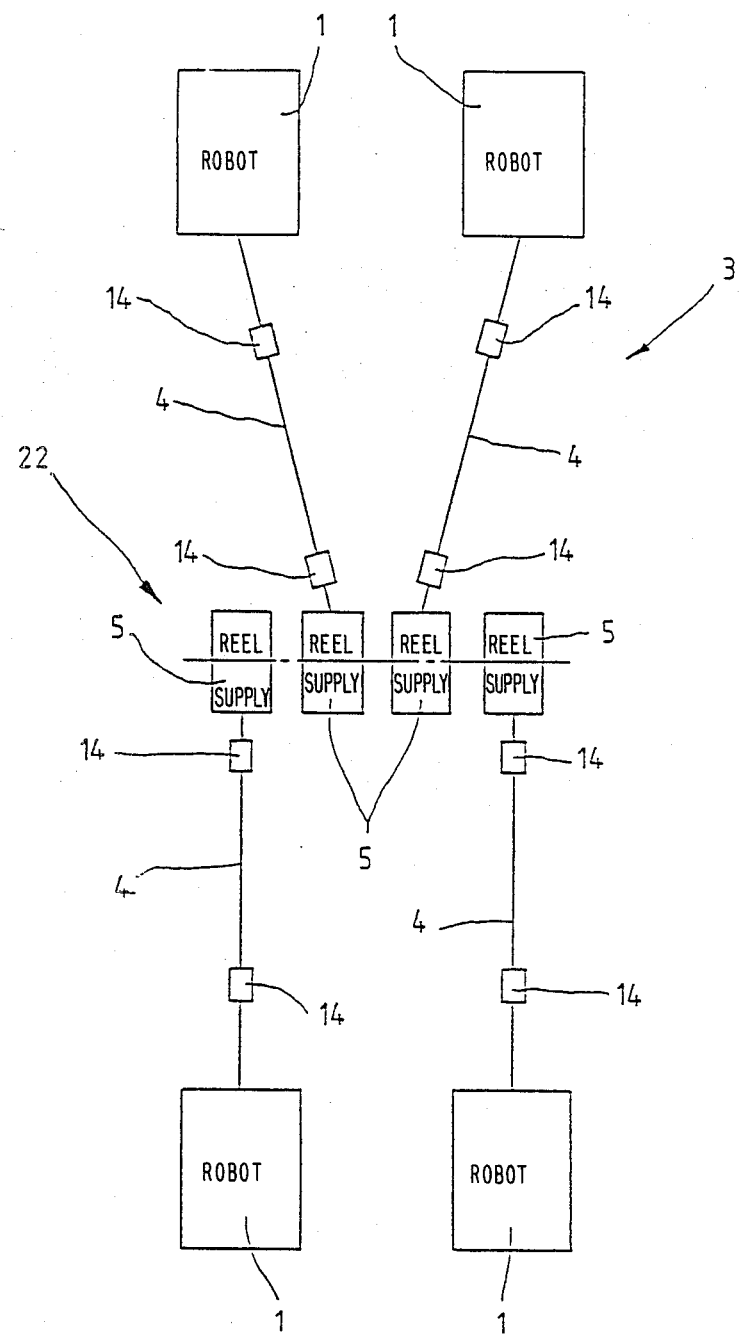
FIG. 6 is a diagrammatic arrangement of several welding robots with an external multiple supply.

FIG. 6 shows a variation of the transport device relative to the embodiment example of FIG. 1. The wire rolls 5 for all welding robots 1 are stored externally at a central station 22. Thereby the welding wire 4 is supplied to the individual welding robots 1 over a relatively long distance by means of several auxiliary drives 14 from the outside. But the individual robots 1 still possess a main and an auxiliary drive 7, 14 as in the embodiment example of FIG. 1-5, into which the welding wire 4 is fed.

The auxiliary drive 14 at the welding robot 1 and the auxiliary drives 14 in the transport path to the central storage station 22 are preferably of identical design and run at the same speed and with the same slip .

As a variant it is possible also to graduate the speed and/or slip within the chain of the auxiliary drives 14. Alternatively the individual auxiliary drives 14 may be of different design, in that for example only the auxiliary drive 14 at the welding robot 1 is speed-controlled and coupled with the main drive 7 in a control-technological manner. Also, it suffices if a swirl head 15 is provided at only one auxiliary drive 14, while the other auxiliary drives 14 have other drive systems with slip.

The slip of the individual auxiliary drive 14 serves also to reduce the motor loads of the two drives 7 and 14.

For long-term operating safety, which is important above all in view of the long operating times, parameter monitoring of the welding process is advisable. For this purpose, among other things, the motor currents for each weld seam are monitored, whereby the control platens and drive motors of the transport device themselves are protected. At the same time, attention is called thereby to the condition of the welding tool, in particular the torch and contact pipe, as well as to the condition of the welding wire conduction 6. With these measures it is possible also to signal a possible blocking of the transport device 3, e.g. by establishment of a maximum current load over a certain time, and to turn it off in time.

While specific embodiments of the invention have been shown and described in detail to illustrate the application of the principles of the invention, it will be understood that the invention may be embodied otherwise without departing from such principles.

What is claimed is:

1. A transport device for a welding wire feed of a robot mechanism, comprising: an applicator for applying welding wire at a location to be welded; welding wire supply means for feeding the welding wire from said supply means to said applicator; a main drive including a two roller wire drive and a main drive motor, said two roller drive acting as a pull drive determining the advance and transport speed of the wire, said two roller drive being positioned adjacent said applicator and operating at substantially constant speed; at least one auxiliary drive positioned upstream from said main drive between said main drive and said supply means, said auxiliary drive including an auxiliary drive motor and an auxiliary wire drive having a swirl head with variable spring-mounted rollers acting with slippage upon the welding wire in the form of a push drive, said auxiliary drive motor operating at a substantially constant speed different from that of the main drive.

2. A transport device according to claim 1, wherein both said main drive and said auxiliary drives have tachocontrolled externally excited dc motors.

3. A transport device according to claim 1, wherein said main and said auxiliary drives convey the welding wire at different feed speeds, said auxiliary drives preferably driving at a higher speed.

4. A transport device according to claim 3, wherein said transport speed of said auxiliary drive is 10 to 40% higher than said main drive.

5. A transport device according to claim 1, including a robot having a plurality of interconnected pivotal links the lase one being a hand portion, said main drive being arranged at said hand portion and said auxiliary drive being arranged at an initial arm of said robot.

6. A transport device according to claim 5, wherein there are a plurality of wire supply rolls including a plurality of robots connected to each of said supply rolls, each including at least one main welding wire drive and at least one auxiliary welding wire drive.

7. A transport device according to claim 1, wherein said wire supply includes a magazine for the welding wire.

8. A transport device for a welding wire feed comprising: a robot having a plurality of interconnected pivotal links including an end hand link; a welding wire supply including a magazine holding the welding wire adjacent said robot; an applicator for applying welding wire at a location to be welded; welding wire supply means for feeding the welding wire from the supply to the applicator; a main drive including a two roller wire drive and a main drive motor, said two roller drive acting as a pull drive determining the advance and transport speed of the wire, said two roller drive being positioned adjacent said applicator and operating at substantially constant speed; at least one auxiliary drive positioned upstream from said main drive between said main drive and supply means, said auxiliary drive including an auxiliary drive motor and an auxiliary wire drive having a swirl head with variable spring-mounted rollers acting with slippage upon the welding wire in the form of a push drive, said auxiliary drive motor operating at a substantially constant speed different from that of the main drive.

* * * * *